Patented Oct. 20, 1931

1,828,525

UNITED STATES PATENT OFFICE

JOSEPH EBERT, OF WESTMONT, NEW JERSEY, ASSIGNOR TO THE FARASTAN COMPANY, OF PHILADELPHIA, PENNSYLVANIA, A CORPORATION OF PENNSYLVANIA

IODINE ADDITION PRODUCTS OF QUINOLINE CARBOXYLIC ACIDS AND DERIVATIVES THEREOF

No Drawing.   Application filed December 30, 1929.   Serial No. 417,604.

This invention relates to iodine addition products of quinoline carboxylic acids and their derivatives, such as the mono-iodo compounds and the di-iodo compounds in which the iodine is loosely coupled with the nitrogen of the pyridine nucleus.

I have found that iodine can be loosely coupled with the nitrogen in the pyridine nucleus of quinoline carboxylic acids and esters of these acids and that the compounds thus formed have valuable medicinal properties, more particularly for the treatment of gout, rheumatism, colds and related ailments. When taken internally these compounds split off free iodine instead of liberating hydriodic acid as is the case with inorganic and organic iodides now used. These new compounds have a high effectivness and their use does not involve undesirable secondary actions such as depression of the heart or digestive disorders. Instead, these new compounds have a general tonic effect on the system.

More particularly, my invention relates both to iodine addition products of those quinoline carboxylic acids which can be prepared from pyruvic acid, an aryl aldehyde and an organic amine such as aniline, or by the reaction of a ketone such as acetophenone and isatin and to the iodine addition products of esters of these quinoline carboxylic acids. The preparation of quinoline carboxylic acids by these methods is well known in the art as evidenced by the references in Beilstein, 3rd edition, vol. 4, page 445. In quinoline carboxylic acids prepared by either of these methods, the carboxylic acid group is in the 4 position and the hydrogen of the 2 position is substituted by an aryl group. By varying the starting materials, various aryl groups may be substituted in the 2 position and alkyl groups may be introduced into the 6 position. The iodine addition products of these compounds may be represented by the general formula

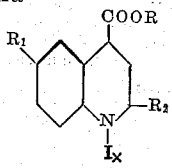

in which R may be hydrogen or an alkyl group, $R_1$ may be hydrogen or an alkyl group, $R_2$ is an aryl group and X may be one or two. The reaction with iodine may be so carried out that a mixture of the mono-iodo and di-iodo compounds is obtained.

The iodine addition products may be prepared by suspending the acid or ester in an alcoholic or aqueous solution containing a suitable amount of iodine at a temperature preferably between about 15 and 50° C., for about 12 to 24 hours or until the desired amount of iodine has become coupled with the nitrogen of the pyridine nucleus. The mixture may then be diluted with water and acidified to separate the new compound. The compound is then filtered off and washed with cold water and subsequently dried at a low temperature. In place of employing iodine, iodine-furnishing materials may be used. The reaction products are in general of a reddish brown, dark brown or greenish brown color. They are generally substantially insoluble in water but soluble in certain organic solvents such as alcohol and acetone. The iodine is loosely coupled with the quinoline carboxylic acids and esters and when the iodine addition products are mildly heated they gradually liberate iodine. At high temperatures they decompose with formation of complex iodine and oxidation products. The invention will be further illustrated by the following examples:

I. 2-phenyl-mono-iodo-quinoline-4-carboxylic acid

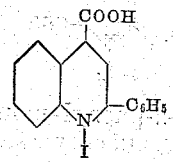

2.5 parts by weight of 2-phenyl-quinoline-4-carboxylic acid (cinchophen, which may be made from aniline, benzaldehyde and pyruvic acid) are suspended in a solution of 1.27 parts by weight of iodine in ethyl alcohol and agitated at a temperature of from 15 to 50° C. for about 12 to 24 hours, or until the color of the supernatant solution is only slightly yellow. The solution is diluted with water and 4 parts by weight of 10% HCl are added. The precipitate is filtered off, washed with cold water and dried at a low temperature, for example below 40° C. The new compound is of reddish brown color, contains about 33.6% iodine, is substantially insoluble in water, soluble in alcohols and acetone, also soluble in solutions of alkalies out of which solutions it is reprecipitated by the stochiometric amount of mineral acid. On heating, the new compound gradually gives off iodine until at about 150 to 190° C. (depending on the rate of heating) decomposition takes place with formation of complex iodine and oxidation products.

II. 2-phenyl-di-iodo-quinoline-4-carboxylic acid 2.5 parts by weight of 2-phenyl-quinoline-4-carboxylic acid (cinchophen) are suspended in a solution of 2.54 parts by weight of iodine in ethyl alcohol and agitated at a temperature of from 15 to 50° C. for about 24 to 50 hours, or until the supernatant solution is slightly yellow. The reaction mass is worked up in the same manner as in Example I. The new compound is of a dark brown color, contains about 50% of iodine, and is soluble in the same solvents as compound No. I. On heating, the compound shows substantially the same behavior as the mono-compound.

In a similar manner the mono-iodo and di-iodo addition products of both the methyl and ethyl esters of 2-phenyl-quinoline-4-carboxylic acid can be prepared thus:

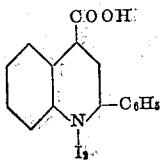

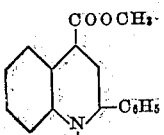

III. 6-methyl-2-phenyl-mono-iodo-quinoline-4-carboxylic acid ethyl ester

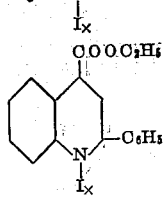

2.91 parts by weight of 6-methyl-2-phenyl-quinoline-4-carboxylic acid ethyl ester (which may be made by esterifying the acid obtained from paratoluidine, benzaldehyde and pyruvic acid) are suspended in a solution of 1.27 parts by weight of iodine in ethyl alcohol and agitated at a temperature of from 15 to 50° C. for about 12 to 24 hours, or until the color of the supernatant solution has become yellow. The mixture is diluted with water and acidified with 4 parts by weight of a 10% HCl. The precipitate is collected on a filter, washed with cold water and dried at a low temperature. The new compound is of dark brown or greenish-brown color, contains about 30% iodine, is substantially insoluble in water, soluble in alcohols and acetone. On heating it starts to melt at about 80° C., about this temperature decomposition takes place.

The 6-methyl-2-phenyl-di-iodo-quinoline-4-carboxylic acid ethyl ester has been prepared in an analogous manner. It contains about 46.6% iodine.

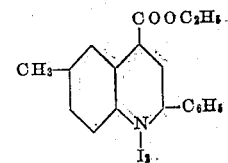

In a similar manner mono-iodo and di-iodo compounds have been formed, as follows. The starting materials from which the quinoline carboxylic acids may be prepared are indicated in parentheses:

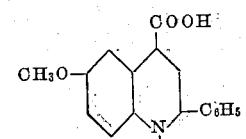

from 6-methoxy-2-phenylquinoline-4-carboxylic acid (p-anisidine, benzaldehyde and pyruvic acid).

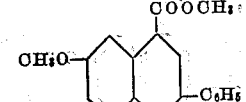

from methyl ester of the same.

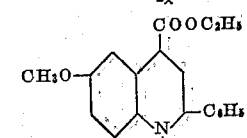

from ethyl ester of the same.

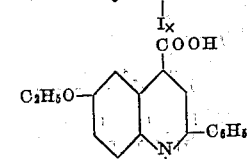

from 6-ethoxy-2-phenylquinoline-4-carboxylic acid (p-phenetidine, benzaldehyde and pyruvic acid).

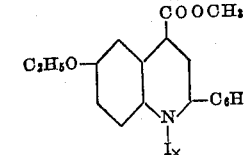

from methyl ester of the same.

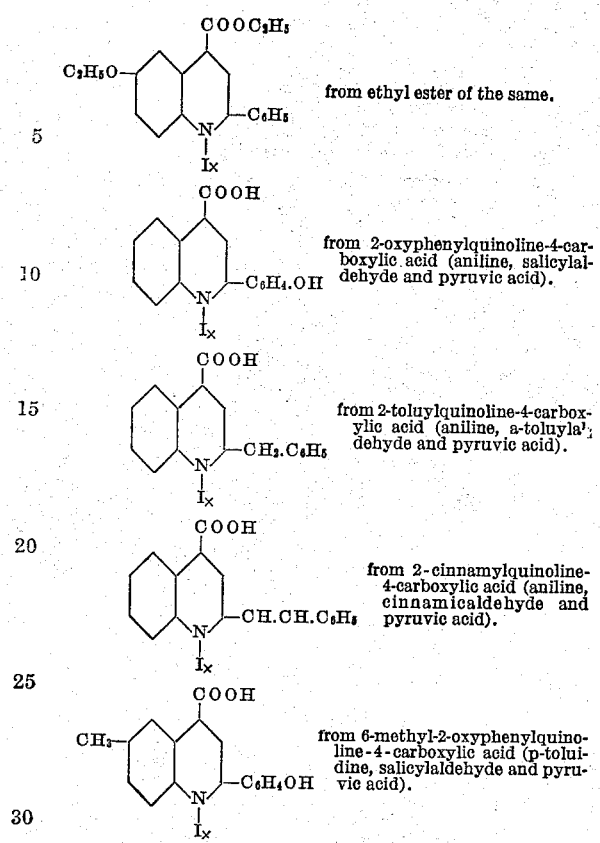

This application is in part a continuation of my application Serial No. 241,462, filed December 20, 1927.

I claim:

1. Iodine addition products of quinoline carboxylic acids and esters in which the iodine is loosely coupled with the nitrogen of the pyridine nucleus.

2. Iodine addition products with the general formula

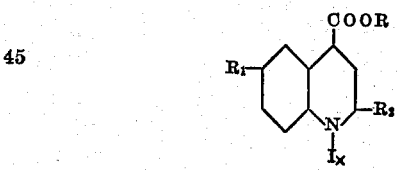

in which R is hydrogen or an alkyl group, $R_1$ is an alkyl group and $R_2$ is hydrogen, aryl or an aralkyl group and X is 1 to 2.

3. Iodine addition products with the general formula

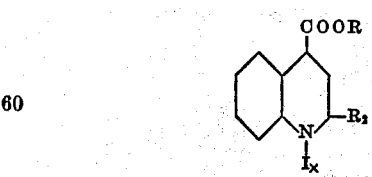

in which R is hydrogen or an akyl group, $R_2$ is an aryl group, and X is 1 or 2.

4. Iodine addition products with the general formula

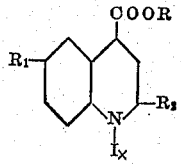

in which R is hydrogen or a methyl or ethyl group, $R_1$ is hydrogen or the methyl group or the methoxy group or the ethoxy group and $R_2$ is the phenyl group or $-C_6H_4.OH$ or $-CH_2.C_6H_5$ or $-CH:CH.C_6H_5$ and X is 1 or 2.

5. Iodine addition products of 2-phenyl-quinoline-4-carboxylic acid in which the iodine is loosely coupled with the nitrogen of the pyridine nucleus.

6. As a new compound:

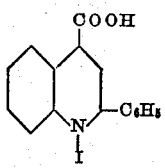

In witness whereof, I have subscribed my name.

JOSEPH EBERT.